United States Patent [19]
Klopfenstein et al.

[11] 3,794,969
[45] Feb. 26, 1974

[54] APPARATUS FOR ALERTING VEHICLE DRIVER

[76] Inventors: Floren R. Klopfenstein, 9754 Diebold, Fort Wayne, Ind. 46825; Gene J. Duff, Box 307, Willshire, Ohio

[22] Filed: Jan. 22, 1973

[21] Appl. No.: 325,920

[52] U.S. Cl. .............................. 340/52 R, 340/279
[51] Int. Cl. .......................................... G08b 21/00
[58] Field of Search............. 340/52 R, 53, 279, 56

[56] References Cited
UNITED STATES PATENTS
3,222,639  12/1965  Kayser, Jr. ...................... 340/279 X
3,222,640  12/1965  Wurst ............................. 340/279 X Primary Examiner—Alvin H. Waring
Attorney, Agent, or Firm—Albert L. Jeffers; Roger M. Rickert

[57] ABSTRACT

An apparatus for alerting the driver of a vehicle when the steering wheel is not moved in a normal manner in which a detector is provided which detects movements of the steering wheel as little as 2° when the steering wheel is within normal generally straight ahead driving range with the detector operating time delay means which cause an alarm to emit a signal if the steering wheel is not moved at least about 2° in a certain interval of time.

13 Claims, 6 Drawing Figures

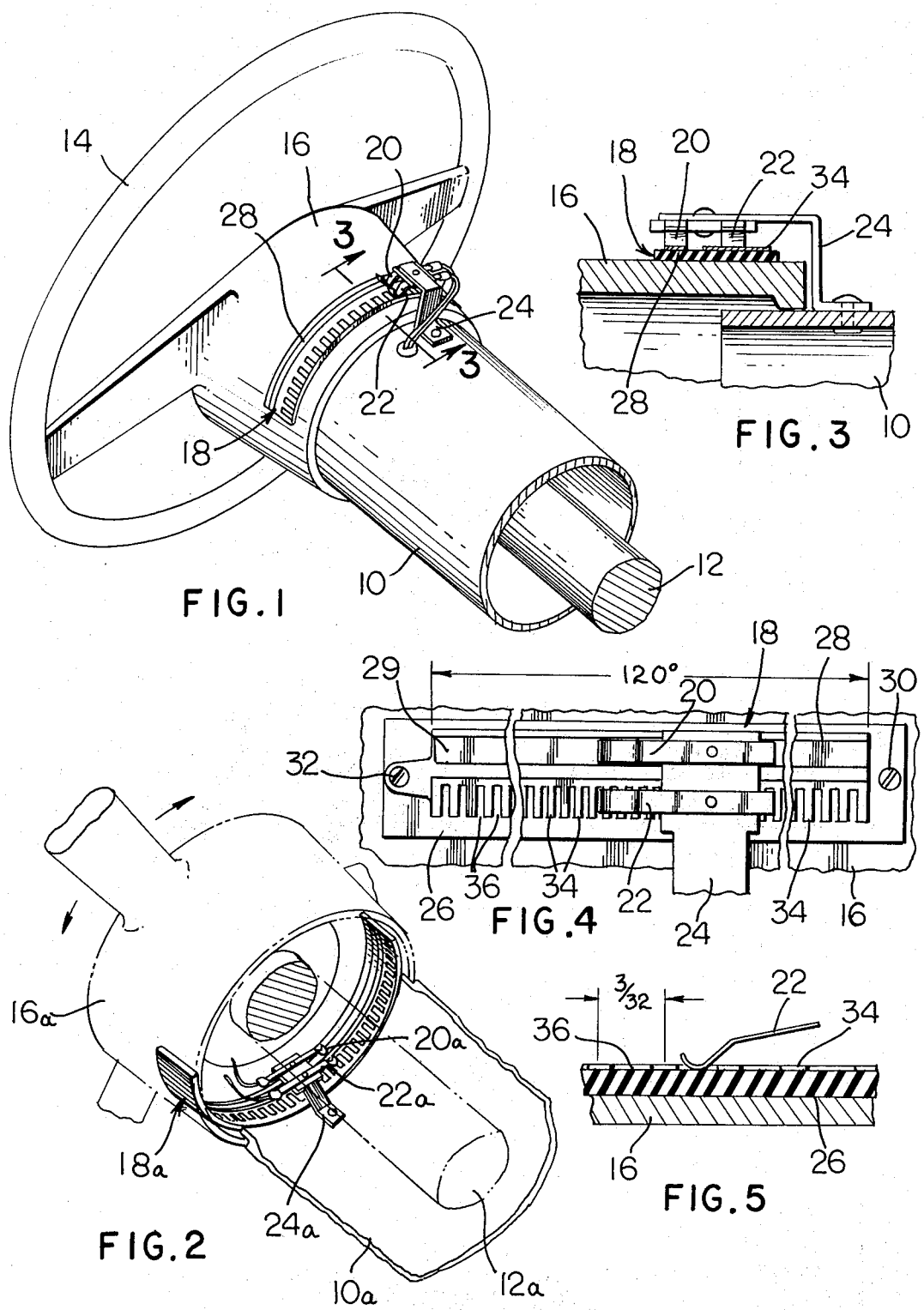

APPARATUS FOR ALERTING VEHICLE DRIVER

The present invention relates to an apparatus for alerting the driver or operator of a vehicle in the event the driver fails to move the steering wheel of the vehicle in a normal manner for a predetermined period of time.

It has been found, under ordinary driving conditions, the steering wheel of a vehicle will be adjusted at least every few seconds in order to maintain the vehicle in a predetermined path. Failure to so move the steering wheel can be taken as an indication that the driver has become inattentive or has dozed off and a dangerous situation has been created.

In U.S. Pat. Nos. 2,875,430 and 3,222,640 apparatus disclosed for alerting a vehicle operator under the circumstances above described with each patent disclosing a detecting device operable for detecting movements of the steering wheel. The present invention is particularly concerned with an improvement in apparatus of the nature referred to, especially in connection with the detecting device which detects movement of the steering wheel and with the circuitry leading up to the point of emitting the alarm.

With the foregoing in mind, a particular object of the present invention is the provision of a vehicle operator alerting apparatus of the aforesaid nature having an improved detecting device for detecting movements of the steering wheel of the vehicle.

A further object is the provision of an improved circuitry under the control of the detecting device and operable for causing an alarm to emit a signal.

The foregoing objects as well as still other objects and advantages of the present invention will become more apparent upon reference to the following detailed specification taken in connection with the accompanying drawings in which:

FIG. 1 is a perspective view showing a detector device according to the present invention mounted on the outside of the hub of a vehicle steering wheel.

FIG. 2 is a view similar to FIG. 1 but shows how the detecting device could be mounted on the inside of the hub of the steering wheel.

FIG. 3 is a section indicated by line III—III on FIG. 1.

FIG. 4 is a developed view partly broken away showing the detector arrangement according to the present invention more in detail.

FIG. 5 is a fragmentary sectional view indicated by line V—V on FIG. 4 showing a portion of the detector arrangement.

Figure 6:
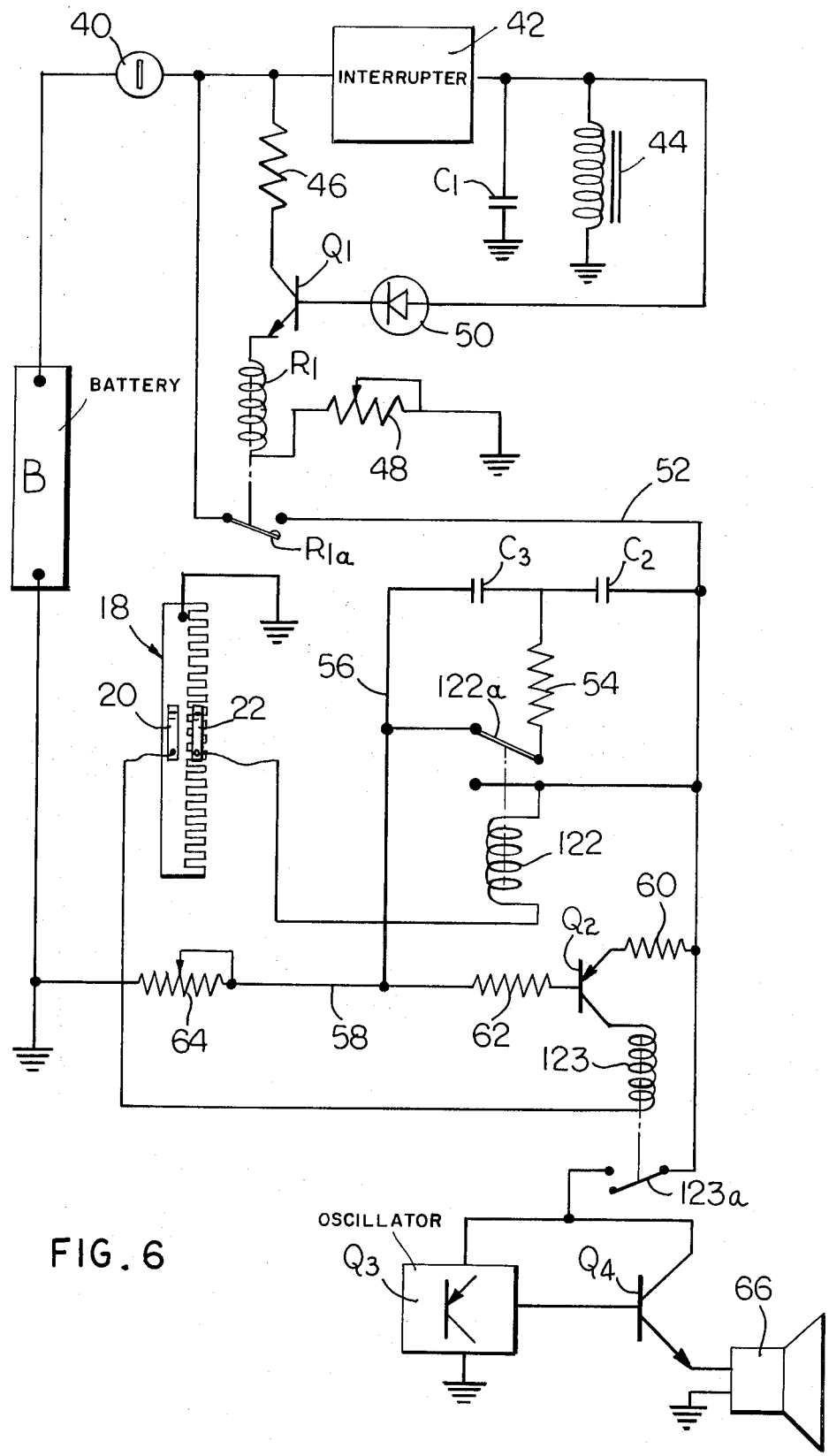

FIG. 6 schematically illustrates the control circuit according to the present invention.

DETAILED DESCRIPTION OF THE INVENTION:

Referring to the drawings somewhat more in detail, 10 indicates the nonrotatable housing of a steering column within which is rotatable a steering shaft 12 having mounted on one end a steering wheel 14. Steering wheel 14 has a hub portion 16 telescopically engaging the upper end of nonrotatable column 10.

According to the present invention, a detector is provided for detecting motion of the steering wheel and this comprises an arcuate printed circuit board generally indicated at 18 which, in FIG. 1, is mounted on the outside of hub 16. Engaging the printed circuit board are brushes, or wipers, 20 and 22 insulatingly supported on a bracket 24 fixed to non-rotatable column 10 adjacent hub 16.

FIG. 2 shows how a printed circuit board, indicated at 18a, could be mounted on the inside of hub 16a of a steering wheel and be engaged by brush means 20a and 22a insulatingly mounted on a support bracket 24a which, in this case, is connected to the inside of the nonrotatable steering column 10a.

FIG. 3, which is a section on line III—III of FIG. 1, shows more in detail the relative positioning of the steering hub 16, the nonrotatable steering column 10, the support bracket 24, the brushes, or wiper, 20 and 22 and the printed circuit board 18.

FIG. 4 is a developed view of a circuit board and may be either board 18 or board 18a. The circuit board comprises a base part 26 of electrical insulating material and printed thereon, in a well known manner, is a conductive strip 28. Board 26 is secured to hub 16 of the steering wheel as by screws 30 and 32 and one thereof, in this case, screw 32, electrically engages strip 28 and also electrically engages the metallic hub of the steering wheel and forms a ground connection for strip 28.

Strip 28 has an uninterrupted region 29 on which wiper 20 rests while wiper 22 rests on a marginal region of strip 28 which is made up of a plurality of spaced teeth 34 so that as the circuit board and the wipers move relatively, the engagement of brush 22 with the grounded strip 28 will be interrupted and reestablished repetitively.

As will be seen in FIG. 5, the teeth 34 may be spaced about 3/32 apart and, when the steering wheel rotates relative to the wiper 22, there is a change of condition about every two degress of rotation. That is, if the wiper 22 rests on an open space 36, between a pair of teeth, about a two degree rotation of the steering wheel will bring the wiper into engagement with a tooth and about two more degrees of rotation will bring the brush back into an open space 36.

The circuit in which the described detector is incorporated is illustrated in FIG. 6. In FIG. 6, a battery B has one side grounded and the other side is connected through a key operated ignition switch 40 with one side of an interrupter 42, the other side of which is connected to one end of the primary 44 of an ignition coil, the other side of which is grounded. A capacitor C1 is arranged in parallel with primary 44.

The side of ignition switch 40 opposite battery B is also connected with a blade R1a of a relay having a relay coil R1 and also with one end of a resistor 46, the other end of which is connected with the collector of a transistor Q1, the emitter of which is connected with one end of coil R1. The one end of coil R1 is connected through an adjustable potentiometer 48 with ground.

The base of transistor Q1 is connected through a zener diode 50 with the end of primary coil 44 opposite the ground connection thereof.

Blade R1a, upon energization of coil R1, will close on a terminal connected to a wire 52. Wire 52 is connected to one side of a capacitor C2, the other side of which is connected with one side of a second and equal capacitor C3 and also with one end of a resistor 54, the other end of which is connected with a relay blade 122a of a relay having a coil 122.

Blade 122a has two positions, depending on whether coil 122 is energized or deenergized and, in one position, rests on a contact connected to a wire 56 which is connected to the side of capacitor C3 opposite capacitor C2 and also to a wire 58. In its other position, blade 122 closes on a terminal which is connected with wire 52 and also with one end of coil 122, the other end of which is connected with the aforementioned brush or wiper 22 of the above described detector.

Wire 52 is also connected through a resistor 60 with the emitter of a transistor Q2, the base of which is connected through a resistor 62 with wire 58. Wire 58, in turn, is connected through a potentiometer 64 with the grounded side of battery B.

The collector of transistor Q2 is connected to one end of a relay coil 123, the other end of which is connected with the aforementioned brush or wiper 20.

Coil 123, when energized, closes a blade 123a that is connected to wire 52 and which, when closed, engages a terminal connected to the collector of a transistor Q4 and to the input terminal of a transistorized oscillator indicated at Q3. Oscillator Q3, when energized by closing of blade 123a, supplies signals to the base of transistor Q4 which serves as an amplifier and supplies an amplified signal to a speaker 66 which emits an audible signal.

OPERATION:

In operation, when ignition switch 40 is turned on to supply energy to the ignition system, energy is also supplied to blade R1a. When the engine is running and interrupter 42 is operating, the voltage at the upper end of relay coil 44 will rise as engine speed increases. At a predetermined selected speed, determined by adjustment of potentiometer 48, transistor Q1 will cause relay R1 to close.

Relay R1 might close, for example, at 1½ volts and will thereafter remain closed down to about 0.075 volts. Thus, once the potentiometer 48 is adjusted to cause relay R1 to close at a selected speed, the relay will remain closed through periods of deceleration when the engine speed drops below the selected speed for a short period of time.

With blade R1a closed, one or the other of condensers C2, C3 will charge up through resistor 54 and potentiometer 64, depending on whether or not coil 122 is energized. When either condenser charges up to a certain level, transistor Q2 goes conductive energized coil 123 and closing blade 123a thereby energizing oscillator Q3 and amplifier Q4 and causing speaker 66 to emit an audible signal. Oscillator Q3 is arranged so that the output signal therefrom to transistor Q4 begins at about 400 cycles per second and goes up to about 1,000 cycles per second so that a pronounced warning signal is supplied to the vehicle operator.

It will be apparent that whenever the steering wheel is moved as much as 2°, whichever one of the condensers C3, C2 is charging will discharge and the other thereof will commence to charge so that each such movement of the steering wheel will initiate a new time delay period.

The adjustment of the potentiometer 64 will control the charging time of condensers C2 and C3 and this can be varied anywhere from about ½ second up to about 7 seconds.

The normal driving range can be considered to represent a maximum deviation of a vehicle from dead ahead up to about 10° on either side, namely, total range of about 20°. The steering ratio in an average vehicle is about 6 to 1 so that the average range of rotation of the steering wheel for the 20° range of vehicle direction is about 120°. The conductive segment 28 on which the printed circuit board thus extends over a range of about 120° as indicated in FIG. 4.

When a turn, or curve, exceeds 10° from straight ahead, the brushes 20 and 22 run off the conductive portion of the circuit board and at this time neither of relays 122 nor 123 will close. The circuit is thus quiescent when the vehicle is going around curves, or turns, in which the vehicle deviates more than about 10 degress from straight ahead.

The switching arrangement has been disclosed as being two members, one of which is stationary and the other of which is moveable and which are cooperative showing a total range of vehicle wheel movement of 120°. It is contemplated, however, that the switching movement could be such that cooperation between the two switch members would continue over the entire 360° of rotation of the steering wheel. It will, therefore, be understood that the specific disclosure of switch members which cooperate over a range of about 120° is not intended in any way to be limiting.

Modifications may be made within the scope of the appended claims.

What is claimed is:

1. In apparatus for alerting the operator of a motor vehicle upon failure to actuate the steering wheel of the vehicle in a normal manner; a detecting device comprising a first element in the form of a series of spaced contacts and a second element in the form of a wiper resting on said first element and adapted to engage said contacts sequentially and individually upon relative movement of said elements as brought about by movement of the steering wheel, one of said elements being mounted on the steering wheel and the other being stationarily supported adjacent the steering wheel, a pair of time delay circuits, electrically operable alarm means actuatable to emit a signal for alerting the vehicle operator, alarm actuating circuit means responsive to continued energization of either of said time delay circuits for a predetermined length of time for actuating said alarm means, a switch having two positions wherein respective ones of said time delay circuits are energized, and switch actuating means under the control of said detecting device for moving said switch into one position thereof when said wiper engages a said contact and into the other position thereof when said wiper is not engaging said contact.

2. An apparatus according to claim 1 in which said contacts are so spaced that a movement of the steering wheel of about 2° will effect a change in the position of said switch.

3. An apparatus according to claim 1 in which said first element extends over a range of about 120° of steering wheel movement, and control means for making said alarm means ineffective in response to movement of the steering wheel beyond either limit of said range of 120°.

4. An apparatus according to claim 1 in which said first element is a board of electrical insulating material having said contacts thereon in the form of a printed circuit.

5. An apparatus according to claim 1 in which said first element is a board of electrical insulating material having said contacts thereon in the form of a printed circuit, said contacts being electrically interconnected and connected to ground, said switch actuating means comprising a solenoid having one end connected to said wiper and the other end connected to one side of a source of energy having the other side connected to ground.

6. An apparatus according to claim 3 in which said control means comprises an uninterrupted and grounded conductive region on said first element extending over said range of 120°, a second wiper engaging said uninterrupted conductive region, said alarm actuating circuit means including a connection to ground via said second wiper and being ineffective for actuating said alarm means upon interruption of said ground connection.

7. An apparatus according to claim 1 in which said alarm means comprises oscillator means, amplifier means supplied by said oscillator means, and speaker means supplied by said amplifier means.

8. An apparatus according to claim 1 in which said oscillator means supplies an output at about 400 Herz when first energized with said output increasing in frequency up to about 1000 Herz upon continued energization of said oscillator means.

9. An apparatus according to claim 1 in which said alarm means includes a transistorized oscillator, an amplifier and a speaker, a source of energy, a first transistor having the collector-emitter path operatively interposed between said source and said oscillator, said amplifier comprising a second transistor having the collector-emitter path operatively interposed between said source and said speaker, the base of said second transistor being connected to said oscillator to receive signals therefrom, and the base of said first transistor being connected to said time delay circuits to receive biasing signals therefrom.

10. An apparatus according to claim 9 which includes a switch having one side connected to said source and the other side connected to supply said oscillator and the collector-emitter path of said second transistor, said switch having an actuating coil, a ground connection to one end of said coil and the other end being connected to the collector-emitter path of said first transistor.

11. An apparatus according to claim 10 in which said ground connection comprises an uninterrupted conductive region on said first element extending over a range of about 120° of movement of the steering wheel and grounded, and a second wiper connected to said one end of said coil and resting on said uninterrupted conductive region of said first element.

12. An apparatus according to claim 11 in which said elements are so disposed that said first mentioned wiper is in about the middle of said series of spaced contacts and said second wiper is in about the middle of the length of said uninterrupted conductive region when the steering wheel is adjusted into position for the vehicle to proceed straight ahead.

13. An apparatus according to claim 1 in which said first element extends over a range of 360° of steering wheel movement.

* * * * *